Nov. 2, 1971   J. H. LEMELSON   3,616,495
MOLDING APPARATUS
Filed April 15, 1968

INVENTOR.
JEROME H. LEMELSON

United States Patent Office 3,616,495
Patented Nov. 2, 1971

3,616,495
MOLDING APPARATUS
Jerome H. Lemelson, 85 Rector St.,
Metuchen, N.J. 08840
Continuation-in-part of applications Ser. No. 421,860 and
Ser. No. 421,817, both Dec. 29, 1964, and Ser. No.
439,549, Mar. 15, 1965, which in turn are continuations-
in-part of application Ser. No. 734,340, May 9, 1958,
now Patent No. 3,173,175. This application also is a
continuation-in-part of application Ser. No. 142,405,
Oct. 2, 1961, now Patent No. 3,422,648. This application Apr. 15, 1968, Ser. No. 721,401
Int. Cl. B29f 1/00
U.S. Cl. 18—30 CK
16 Claims

ABSTRACT OF THE DISCLOSURE

An apparatus and method for the controlled molding of materials is provided whereby a plurality of molding variables may be predeterminately controlled in accordance with variations in the molding materials, size and shape of the molded parts and desired physical characteristics of the finished article. Molding variables such as movement of one or more mold components, timing of the injection of molding material, variations in flow of molding material and heating or cooling of the mold walls may be preprogrammed so as to each vary predetermined degrees during a molding cycle so that such variables increase and/or decrease in predetermined relationship to each other to provide a molded article having predetermined and optimum physical characteristics.

In one form of the invention, molding variables are controlled by the reproduction of prerecorded analog signals from a recording member which signals are used to variably control motors controlling the molding variables. The analog signals may be derived from transducers indicating variations in said motors during the operation of an optimum molding cycle.

RELATED APPLICATIONS

This is a continuation-in-part of applications Ser. No. 421,860 filed Dec. 29, 1964, for Molding Apparatus, Ser. No. 421,817 filed Dec. 29, 1964, for Molding Techniques and Ser. No. 439,549 filed Mar. 15, 1965, for Automatic Molding Apparatus, all of which are now abandoned and which are in turn continuations-in-part of application Ser. No. 734,340, which was filed May 9, 1958, for Molding Apparatus, now U.S. Pat. 3,173,175. This is also a continuation-in-part of application Ser. No. 142,405 filed Oct. 2, 1961, for Extrusion Apparatus, now U.S. Pat. No. 3,422,648.

SUMMARY OF THE INVENTION

This invention relates to an automatic molding apparatus and method for molding materials such as thermoplastic resins in the cavity or cavities of a mold by automatically controlling one or more molding variables during the molding process. Control of such molding variables is effective in not only reducing the molding cycle time but also producing a molded article having predetermined and improved physical characteristics.

In the molding of various articles of manufacture by injection molding, it is the practice to inject a molten molding material into a cavity of a multiple-part mold after the mold has been closed, maintain the mold closed for a predetermined time interval in order for all of the molding material to solidify and thereafter open the mold to remove one or more molded articles therefrom. Such molding procedure which employs conventional thermoplastic resins, generally requires extremely high press forces to maintain the mold sections closed during the molding cycle as substantially high pressures are required to inject the molding material into the mold. Frequently, molding pressures must be substantially high in order to assure that the molten molding material completely fills out the mold cavity during the initial shot and to reduce the effects of part shrinkage to a minimum. Thus, the force necessary to effect the clamping or locking of the mold parts during molding may exceed two or three thousand tons for a plastic molding or moldings covering, for example, between one thousand and two thousand square inches. Accordingly, relatively large molding presses are required to mold medium or large articles due to the fact that smaller presses are not built to resist or effect the larger mold locking forces.

A number of means are provided herein for effecting the molding of one or a plurality of articles of thermoplastic resin materials from the molten state at substantially lower molding pressure and necessary mold clamping pressures than are required of the conventional injection molding process. A primary object of the current invention is thus to provide a new and improved molding apparatus for molding articles of thermoplastic resins and other suitable materials including metals and ceramics provided in a molten state without the need for effecting extremely high mold clamping forces and pressures to inject the materials into the mold.

Another object is to provide an apparatus for molding articles of molten molding material and controlling the shape of the molded article at least in part by movement of one or more mold parts after the molding material has been admitted to the mold.

Another object is to provide an apparatus for molding in which the final shape of a molded article is determined by movement of one or more mold parts which define a portion of the molding cavity, to predetermine the final cavity volume during the latter portion of the molding cycle.

Another object is to provide an apparatus for molding material by first injecting said material into the mold to partially fill a cavity thereof and thereafter causing flow of the molding material by displacing same within the molding cavity.

Another object is to provide a molding apparatus having means for varying such molding variables as the timing, rate-of-flow and pressure of a molding material into a mold, the opening and closing of mold parts and the timing and rate-of-flow of heat transfer fluid to the mold and including a variable programming means for predeterminately varying such variables in a controlled molding cycle to permit, not only control of the opening and closing of the mold and the injection of molding material, but also control of mold separation during the molding process itself so as to control the force applied to the mold and the material solidifying therein.

Another object is to provide an apparatus for molding in which one part of a multiple-part mold may be moved in both directions towards and away from another part of the mold during a molding cycle and may be controlled in such movement to account for both the injection of the molding material and the expansion or contraction of the molded article during different portions of the molding cycle so as to reduce stresses on the mold and the molding machine and to improve the physical characteristics of the molding. In this connection, a molding apparatus is provided in which one of the mold parts may be oscillated or vibrated with respect to the other mold part during the molding operation in accordance with the programmed control of the servo moving said one-mold part.

With the above and such other objects in view as may hereafter more fully appear, the invention consists of the novel constructions, combinations and arrangements of parts as will be more fully described and illustrated in the accompanying drawings, but it is to be understood that changes, variations, and modifications may be resorted to which fall within the scope of the invention as claimed.

Figure 1:
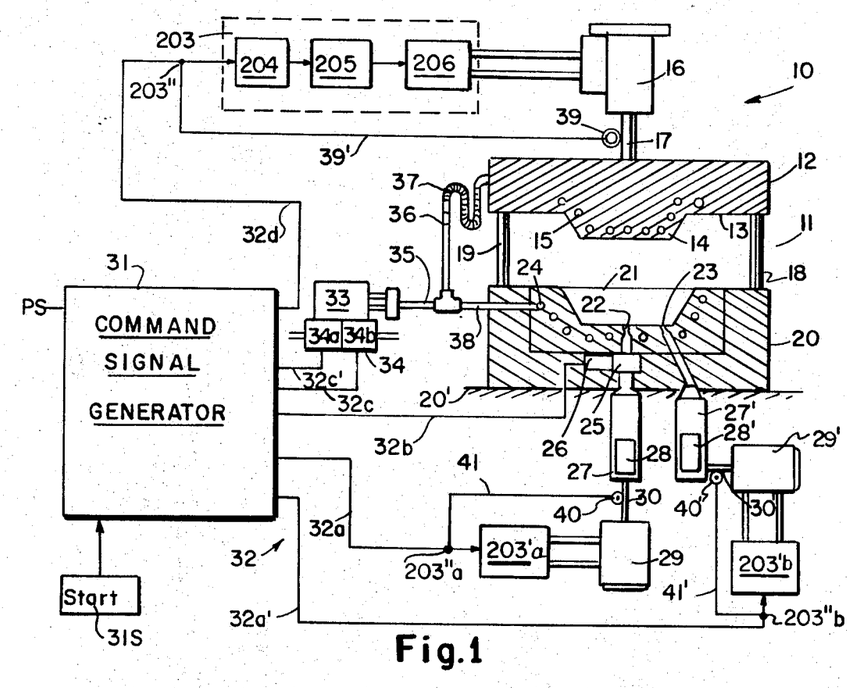
FIG. 1 is a schematic diagram showing an automatic molding apparatus embodying features of the instant invention.

In FIG. 1 is shown an automatic molding apparaus 10 employing a feedback control system for controlling the separation or closure of mold components 12 and 20 which are supported in a molding press 11 and together define a molding cavity disposed between a portion 14 of the male mold member 12 and a cavity 21 in the female mold member 20. Notations 18 and 19 refer to a plurality of rod-like guides or tracks for guiding the male mold member 12 in movement towards and away from the female mold member 20 as actuated by a hydraulic ram or cylinder 16 having an output shaft 17 which is operatively connected to the male mold member 12. The mold members are shown separated and the female mold member 20 is a stationary unit mounted on the frame or base 24 of the molding machine 11.

Although molding material may be injected into the molding cavity while the mold members are either separated or closed, through either the male or female mold members, in FIG. 1 injection passageways 22 and 23 are shown terminating at the wall of the female mold cavity. Operatively connected to the injection passageway 22 is a molding material injection device 27 which may include a ram or screw injector or an injection means operating on both the ram and screw principle to deliver a predetermined quantity of molding material in accordance with the operation of an injection motor 29 the output shaft 30 of which is operatively connected to the injector 27 for operating same and delivering a preprogrammed quantity of molding material to the mold cavity. Notation 28 refers to a hopper or other suitable input means for molding material to the injector 27 and notation 25 refers to a valve disposed in the passageway 22 in the mold between the output of the injector 27 and the mold cavity. Said valve is operable for specialized operation of the molding apparatus as will be described hereafter.

In FIG. 1 a second molding material injection means 27′, which may be similar in operation to the injector 27, is also provided for injecting a second molding material having the same or different characteristics than the molding material injected through the means 27, into the mold cavity in a predeterminately controlled manner as will be hereafter described. Suitable hopper or supply means 28′ is operatively connected to the injection means 27′ which is operated by a controlled motor 29′ in a manner to be hereafter described.

Turning now to the operation of the servo device 16 for controlling closure, opening and separation of the mold parts, it is noted that said device 16 may comprise a lineal servo device such as a hydraulic cylinder which is both variably displacement and speed controllable by a controlled electrohydraulic servo system 203 which operates in response to a variable command control signal derived from a computer or command control signal generator 31, which generator is also operative to control the other cycle variables described. As more fully described in my said copending application serial number 142,405 wherein like notations are provided for controlled components 203–207 in FIG. 1 of the instant invention, notation 203 refers to a plurality of controlled components including an electric stroker 204 which varies in its output in accordance with variations in the command control signal receive on an input 32d from the signal generator 31, a hydraulic stroker 205 which is operatively connected to the output of the electric stroker 204 and a variable displacement hydraulic pump which is operated by the hydraulic stroker 205 to vary its output in accordance with variations in the operations of the hydraulic stroker. The characteristcs of the variable displacement hydraulic pump 206 are such that, depending on the position of the slide block thereof, which is controlled by the electro-hydraulic stroker, it may pump in either direction and hence, the position as well as the direction of motion of the ram 17 of the hydraulic cylinder 16 and the rate of travel of said ram will be a function of the characteristic of the signal generated by command signal generator 31 on the input 32d to the electri cstroker 204 during the molding cycle. The command signal generator 31 may comprise an endless recording member such as a multi-channel magnetic drum or closed loop magnetic tape and a pickup or reading transducer operative to reproduce from respective tracks of the recording member and connected to each of the output circuits 32 of the signal generator 31. If suitable variable control signals such as analog signals are recorded in predetermined locations on the tracks of the multi-track recording unit of the command signal generator 31 so that each is reproduced in predetermined time relationship to the other signals, then all of the illustrated servo devices provided in FIG. 1 to effect proper operation of the molding apparatus during a predetermined molding cycle, may be properly operated to cyclically predetermine the relative movement of the mold components, the rate-of-flow and timing of the injected molding material and the timing and rate-of-flow of heat transfer fluid to derive an optimum or predetermined molding operational cycle.

The feedback loop of the system 203, which controls the position, rate-of-travel and direction of motion of the shaft or ram 17 of the hydraulic cylinder 16 and hence the location and rate-of-travel of the male mold member 12, includes a potentiometer 39 having a wiper arm which is coupled by means of gears or the like to the ram or shaft 17 so as to vary the potentiometer setting in accordance bi-directional movements of said shaft whereby the value of the resistance of the potentioemter 39 is a function of the location of said shaft. Thus, the voltage generated on 32d is bucked against the voltage generated by potentiometer 39 in a comparator device 203″ disposed at the input to the electric stroker 204 and the resulting difference signal or voltage is fed to control said electric stroker. The comparator device 203″ may comprise a summing amplifier which is operative to assure that the controlled shaft 17 faithfully follows the command control signals by utilizing the error signal voltage to drive the motor of the electric stroker 204 until the output of the feedback potentiometer 39 equals the voltage output generated on line 32d. The electric stroker 204 in turn controls a valve plunger through precision gearing to effect control of the hydraulic stroker 205 which in turn controls the variable displacement pump 206, the output of which is fed to the cylinder 16 for controlling its operation.

The same mode of control described above is utilized to control the operation of the rams or motors 29 and 29′ controlling the material injection devices 27 and 27′. Notations 203′a and 203′b refers to respective component arrangements similar to those found in block 203 and described as including the respective electric strokers, hydraulic strokers and variable displacement pumps operative to control ram or servo motors 29 and 29′ which respectively control the operation of the injection devices 27 and 27′ for controlling the injection of respective molding materials into the mold cavity in accordance with respect analog signals generated on the input lines 32a and 32a′ to the control blocks 203′a and 203′b. Repective shaft-operated potentiometers 40 and 40′ provide feedback signals on lines 41 and 41′ to respective comparators for providing difference or error signals generated on lines 32a and 32a′ by command signal generator 31 and fed to the inputs of the electro-hydraulic control blocks 203'a and 203'b which have components similar to those defined in control block 203.

A control signal generated on the output 32b of command signal generator 31 is utilized to operate a solenoid 26, when necessary, to close a valve 25 in the injection passageway 22 during a mode of molding operation which will be described hereafter. Outputs 32c and 32c' of the command signal generator 31 are respectively connected to inputs 34a and 34b of a bi-stable solenoid 34 operating a valved pump 33 to cause either hot or cold liquid to flow to an output line 35 which is connected to a line 36 having flexible portion 37 extending to the passageway 15 in mold member 12 and a line 38 extending to passageway 24 in molde member 21. Thus, if the molding material is a thermosetting resin or powdered plastic requiring heat to first cure or render same molten, hot heat transfer liquid may be first flowed through the mold followed thereafter by cold liquid by sequentially energizing controls 34a and 34b.

The apparatus of FIG. 1 may be operated in a number of different modes depending on the characteristics of the molds, the molding material and the components to be molded therefrom. Because of the manner in which the molding variables are controllable, the apparatus 10 may be utilized to effect conventional injection molding, controlled displacement injection molding, controlled molding material pressurization injection molding, multiple material injection molding and a combination of injection molding and displacement molding hereinafter referred to as plunger molding. These various molding processes will be briefly described hereafter so as to properly define the manners in which the variable apparatus of FIG. 1 may be operated.

(I) In a first mode of operation of the apparatus of FIG. 1, the mold part 12 may be totally closed against mold part 20 and maintained in such condition while one or more molding materials are predeterminately injected by means of injection devices 27 and 27' into the mold cavity at the same or different rates of flow and timed in flow commensurate with particular molding variable requirements. In other words, while the mold member 12 is brought to bear against mold member 20 with sufficient force to maintain the two mold members totally closed against each other during a molding cycle, one or more molding materials are each predeterminately and separately injected into the mold cavity defined by the closed mold parts and the injection pressure or pressures are predeterminately controlled and varied, if needed, during the molding cycle so as to predetermine the flow and physical characteristics of the article. For example, the molding material may be initially injected at a high pressure which pressure is thereafter predeterminately reduced so as to reduce the force against the first injected material and the mold parts. Or the molding pressure may be predeterminately increased after initial injection to account for solidification of the initially injected charge or to densify same. An increase and decrease in molding material pressure which varies once or a plurality of times during a molding cycle may also be effected in the apparatus of FIG. 1 by predeterminately varying the signals generated by command signal generator 31 on the output lines 32 thereof so as to densify or otherwise affect the physical characteristics of the molded article.

(II) In a second mode of operation, the variable signal generated on output line 32d may vary during the molding cycle in accordance with time variations in the cycle and also in accordance with variations in the pressure applied to the molding material resulting from either variable operations of the injection servo devices 29 and 29' or contraction or expansion of the molding material as it solidifies. In other words, the operation of hydraulic cylinder 16 may be varied in a preprogrammed manner in accordance wtih variations in other molding variables so as to either reduce the force and strain applied to the mold and molding machine and/or control the shape of the molded article. The displacement of the male mold member 12 may be controlled to initially permit slight separation of the mold parts without opening the mold cavity under the force applied by the injected molding material and thereafter move the mold parts close together to compress the molding material and density or otherwise affect the shape of same.

(III) In a molding process in which molding material expands after it is injected into the mold such as by using a self-expanding or self-foaming molding material or a material which expands, rather than contracts when it solidifies, operation of the cylinder 16 may be predeterminately controlled to allow for a controlled degree of expansion of the molding material so as to prevent its overexpansion or expansion beyond a predetermined degree. In other words, the mold member 12 may be first closed a predetermined degree against the mold member 20 during the initial portion of the cycle in which expandable molding material is disposed in the mold cavity and prior to or during the initial stages of the expansion thereof. As the molding material expands, the mold member 12 is retracted a slight degree away from mold member 20 by the application of suitable variations in the command control signal generated on line 32d so as to not only permit expansion of the molding material but predeterminately control said expansion in both the rate at which it occurs and the final degree of expansion. Accordingly, a new mode for molding self-expanding materials is provided by the apparatus of FIG. 1 when mold servo 16 is properly controlled in its operation.

(IV) In a fourth molding operation where an article is to be molded of composite materials, the apparatus of FIG. 1 may be operative to control both the rate of flow and the timing of the injection of each material as well as the separation and relative movement of the mold components as described during a predetermined molding cycle and in accordance with predetermined requirements of the finished article. In addition to requirements relative to the amount of each component of a multiple component molding material which must be injected into the mold, the timing of the flow of said components may be an important factor in determining the composition of the molded article. Accordingly, by generating suitable command control analog signals on the output lines 32a and 32a' of the command signal generator 31 two or more molding materials may be predeterminately injected into the mold cavity at respective predetermined times during a molding cycle. It is noted that two or more injection devices such as 27 and 27' may feed a single injection passageway for predeterminately delivering known amounts of different molding materials such as different polymers, a polymer and reinforcing or filler material, different metals, or other combinations.

(V) In a fifth mode of operation of the apparatus of FIG. 1, molding material may be injected through either or both the passageways 22 and 23 in the female mold 20 at low pressure while the male mold member 12 is separated either partially or completely therefrom as illustrated. Thereafter, in accordance with a signal generated on the output line 32d, the mold member 12 is closed against mold member 20 so as to plunge the male portion 14 thereof into the molten molding material in the cavity 21 of the female mold member 20 and in a manner to cause said molten molding material to flow throughout the molding cavity and mold into an article as defined by the shape of said cavity. Here again, timing of molding material injection and mold movement may be predeterminately controlled as described to provide a molded article of optimum physical characteristics.

(VI) In still another mode of operation of the apparatus in FIG. 1, the analog signal generated on line 32d may be of such a characteristic to cause the mold servo 16 to close mold member 12 against mold member 20 and to thereafter oscillate said mold member a slight degree a plurality of times during the molding cycle to effect predetermined changes in the molded material. Such oscillation may be effected at relatively low or high frequencies depending on the material and the characteristics of the molded article and may vary in amplitude from a few thousandths of an inch to a quarter of an inch or more, depending on mold or article size and the characteristics of the molding material. Frequencies of one vibration per second to a plurality of vibrations per second may be effected by generating a plurality of pulse signals or a suitable analog wave form of the desired frequency on the output line 32d of the command signal generator 31 or by applying an auxiliary vibrating device such as a solenoid or motor operated vibrator or ultrasonic transducer to the shaft 17 or directly to the mold member 12 and operating same by gating a suitable electrical signal thereto on an output of the command signal generator 31 during the proper interval or intervals of a molding cycle as determined by the operation of the signal generator. Depending again upon the characteristics of the molding material and the article being molded, the frequency of vibration of the mold member 20 may also be varied during a molding cycle to predetermine the characteristics of the molded article, and in certain instances, reduce cycle time by increasing the rate of solidification or densification of the molding material.

(VII) In another mode of operation of the apparatus 10 of FIG. 1, the solenoid operated valve 25 may be maintained closed during a predetermined interval of a molding cycle. For example, if the molding material injection device 27 is a preplasticizing screw or ram operative to gradually build up pressure on the molding material, the solenoid valve 25 may be maintained closed while the molding material is pressurized a predetermined degree prior to injection and suddenly opened thereafter upon receipt of a signal from the command signal generator 31 on line 32d after the mold members 12 and 20 have been closed so as to permit the molding material to suddenly flow at high pressure into the mold cavity. After the admission of a predetermined quantity of molding material, the valve 25 may be again closed by actuation of the solenoid 26 as the result of generating another signal on line 32b or removing the actuating signal therefrom so as to permit the injection servo device 29 to initiate the build up of pressure for the next molding cycle.

The valve 25 may also be closed during the described plunger molding operation when the male mold member 14 displaces molding material disposed in the cavity 21 of the female mold member 20 so as to prevent back flow of molding material into the injection device 27. Such closing of the valve 25 may be effected by generating a suitable control signal on the valve solenoid input line 32b during the proper interval in a molding cycle.

Notation 31S refers to a recycle start control for the command signal generator 31 which may comprise a push button switch which is actuated by an operator or may be activated by a signal reproduced from one of the recording channels of the signal generator 31. In other words, the command signal generator 31 may be of the self recycling type with the recycle starting time being variably adjustable to permit sufficient time for an operator or automatic manipulator to remove the article from one of the mold cavities upon separation of the mold parts. The operation of such a manipulator may also be controlled as described by signal generated by the command signal generator 31.

(VIII) In still another mode of operation of the apparatus of FIG. 1, a molding material requiring heating during the initial stages of molding such as thermosetting resin or a particulate thermoplastic resin may be admitted to the cavity 21 prior to closure of the mold parts by the described predetermined control of the pump or injection screw motor and simultaneously or in predetermined timed relation to said material flow, the control 34b of the solenoid 34 operating the valve of valved pump 33 may be operated to cause hot heat transfer liquid to flow through the walls of the mold members so as to effect either the curing of the thermosetting resin in the mold or the melting of the particulate thermoplastic material. After said curing or melting is effected, the input 34a to the solenoid 34 may be activated by generation of a control signal on the output 32c' of the command signal generator 31 to cause lower temperature heat transfer fluid to flow through the mold passageways for rapidly cooling the molded article prior to separating the mold parts for removal of said article from the mold.

It is noted that certain features of the hereinabove described mode of operation of the apparatus of FIG. 1 may be combined with the features of certain of the other modes of operation utilizing the same apparatus. For example, the described technique of compressing or releasing pressure on the molding material or vibrating one of the mold members may be employed at one or more stages of the modes of operation defined by notations I, II, III, IV, V, VII and VIII.

(IX) Further modes of operation of the apparatus are noted and include, in addition to the program controlled flow of different molding materials through different passageways such as 22 and 23 in either or both the mold members, the program controlled flow of the same molding material through said different passageways to assure suitable or predetermined distribution of molding material throughout the mold, depending on the shape of the cavity and, in certain instances, to compress or work molding material in the molding cavity.

The two injection means 27 and 27' of FIG. 1 may be operative to flow two different molding materials along a common passageway. One of said injection means may also be operative to flow a reinforcing or decorative material into the mold cavity such as a plurality of reinforcing fibers, particles or beads operative to become part of the eventual molding.

Either of the passageways 22 and 23 of FIG. 1 which are shown extending through the female mold member, may also be disposed between the two mold members such as defined by a channel in each mold member and either or both of the injection means 27 and 27' may be coupleable to the mold to inject molding material at predetermined times during a molding cycle as defined by the master controller or command signal generator 31.

As a replacement or supplement for the fluid heat transfer means of FIG. 1, electrical resistance heating elements or induction means may be secured within either or both of the mold members adjacent the molding cavity and controlled in their operation by the master controller 31. Cooling of the mold adjacent the mold cavity may also be effected by disposing one or more electrical semi-conducting thermoelectric elements or layers of thermoelectric material embedded within, adjacent to or defining a portion of the surface of the mold cavity wall or within the mold or adjacent thereto and in contact wtih heat transfer fluid flowing therethrough to cool or conduct heat from same.

Figure 2:
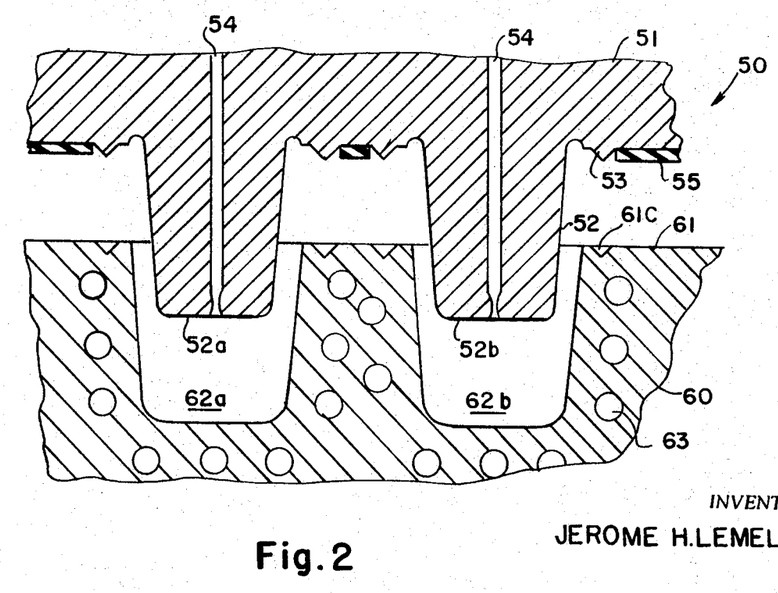
FIG. 2 is a side view in cross section of a portion of a multiple-part mold applicable to the apparatus of FIG. 1.

In FIG. 2 is shown a modified form of mold assembly 50 applicable to the apparatus of FIG. 1 which assembly includes a male mold member 51 having a plurality of protruding male nose portions 52 which are designated 52a and 52b respectively and each operative to be moved into respective cavities 62a and 62b of a female mold member 60 corresponding to the female mold member 20 of FIG. 1. Each of the male nose portions 52a and 52b contains a passageway 54 through which molding material may be admitted to the female mold cavity 62a and 62b while the molds are separated to permit the displacement molding of said material by bringing the molds together and plunging the male portions 52a and 52b into the molding material disposed in the cavity 62a and 62b.

Surrounding each of the male mold portions 52 is a V-shaped formation or bead 53 which is adapted to sealingly engage a channel 61C in the upper surface 61 of the female mold member 60 to prevent the outflow of molding material from the respective molding cavity during the final stages of closure of the male mold member 51 against the female mold member 60. Notation 55 refers to a compressible, elastomeric sealing pad made of a material such as polyurethane rubber which is adapted to serve two purposes during the molding cycle. The pad 55 serves as a shock absorber medium the two mold members and further serves as a sealing material to prevent escape of liquid or molten molding material. In FIG. 2, each of the passageways 54 may contain a solenoid operated valve such as 25 of FIG. 1 or may be connected to a common inlet passageway containing said valve to prevent the back flow of molding material during the portion of the cycle in which the molds are closed and material in the cavities of the molds is displaced by the male portions 52 of the male mold member 51. Notation 63 refers to a heat transfer fluid passageway extending through the female mold member 60 for rapidly cooling and solidifying molding material in a similar transfer fluid system may also be provided in a male mold member 51, although it is not shown in the drawing.

If the molding material is a powdered thermoplastic resin which is rendered molten in the mold by heating the mold as hereinabove described, a predetermined quantity thereof may be fluidized in a gaseous medium such as air and carried thereby through the passageways 54 or 22 into the mold cavity prior to effecting molding thereof by the procedures described. Such particulate molding material may also be delivered to the female mold cavity while the mold parts are separated by auxiliary means (not shown) which is controlled in its operation by command control signals generated by the computer or signal generator 31. For example, particulate thermoplastic molding material such as polyethylene resin may be made to completely fill the female mold cavities after which it is compressed and rendered molten in the mold by the combined action of the male mold member and heat to form a molded article of the desired density. The molding powder may also be metered to partially fill the mold cavity to a predetermined depth thereof prior to closure of the mold parts and molding thereof, employing known means for controllably flowing particulate material and timing means defined by the signal generated by the command signal generator 31 to predetermine the flow of quantity of material delivered to the mold cavity by controlling the operation of said means for flowing said particulate material.

What is claimed is:

1. An automatic molding apparatus comprising in combination:
   (a) a mold composed of first and second mold members defining a molding cavity when said mold members are operatively assembled together for molding,
   (b) means for guiding at least one of said mold members into operative relation with each other for molding an article therebetween,
   (c) first power means for driving said one mold member into operative relation with respect to the other, said first power means also operative for separating said mold members to permit removal of the molded article therebetween,
   (d) first control means for said first power means to control the opening and closing of said mold,
   (e) passageway means through which molding material may be flowed to said cavity,
   (f) second power means for causing molding material to flow through said passageway means to said molding cavity,
   (g) second control means for said second power means operative to control the flow of molding material to said mold,
   (h) variably adjustable master control means having a plurality of control circuits and means for generating a respective control signal on said circuits which may be varied in their timed relationship to each other, said master control means being operatively connected to said first and second control means for said first and second power means and operative to predeterminately control the operation of each power means in a cycle which includes predeterminately variable controlling both the closure of said molds and the operation of said injection means, the opening and closing of the molds and the injection of molding material into the cavity being program controlled and predeterminately varied during a molding cycle.

2. Apparatus in accordance with claim 1, said master control means including a variable program control means for generating a plurality of command control signals for variably activating said first and second control means to vary the operation of said first and second power means whereby the movement to close and open said open mold members is predeterminately controlled and the injection of molding material may be adjusted to occur at any selected time in a molding cycle and may be terminated at any selected time thereafter to control the quantity of material admitted to the mold and the pressure thereof in synchronization with the opening and closing of the mold.

3. Apparatus in accordance with claim 2, wherein said variable program control means includes means for generating a plurality of variable control signals, and means for applying said control signals to variably control said first and second control means.

4. Apparatus in accordance with claim 3, said means for generating a plurality of variable control signals comprising a record means containing recordings of said signals recorded on different channels of said record member and a plurality of transducers with at least one transducer operative to reproduce from each channel and to generate its transduced signals on the input to a respective servo control means in timed relation to the signals transduced on the inputs to others of said control means for said first and second power means.

5. Apparatus in accordance with claim 4 wherein said control signals are generated from a plurality of variable analog signals recorded on different channels of said member and said control means for said first and second power means are each operative to vary the operation of their respective servos in accordance with variations in the analog signals transmitted thereto, said analog signals being recorded on said record means so as to be reproduced by said transducing means in predetermined timed relationship to each other for varying the operation of each of said power means in predetermined synchronized relationship to each other.

6. An automatic molding apparatus in accordance with claim 1, including means for injecting separate streams of molding material into the molding cavity through said passageway means, said second servo means being operative to control the flow of one stream of molding material to said cavity and a third servo operated means for causing flow of a second of said streams of molding material, third control means for said third servo means operatively connected to said master control means, said master control means being programmed to cause the variable timed injection of each of said streams of molding material into said mold cavity by predeterminately controlling said first and second control means whereby the article molded in said cavity is composed of predetermined quantities of molding material admitted to the cavity along each of said streams of molding material.

7. An automatic molding apparatus in accordance with claim 1, including a plurality of passageways in the wall of said mold through which passageways molding material may be flowed to said mold cavity and means for admitting a different molding material to each of said passageways for injecting separate streams of molding material into the molding cavity, a different power operated means for causing flow of each of said streams of molding material, each of said power means being controllable by said master control means to permit variable timed injection of each of said streams of molding material into said mold cavity whereby the article molded in said cavity is composed of predetermined quantities of molding material which are predeterminately disposed in the molding formed in said cavity.

8. An automatic molding apparatus in accordance with claim 1, including means for heating said mold members and means for cooling said mold members, control means for said heating means and control means for said cooling means, said heating and cooling control means being operatively connected to said master control means whereby the mold may be alternately heated and cooled in sequence to respectively heat and change the physical condition of the molding material during a first portion of a molding cycle and thereafter cool the molding material during a second portion of a molding cycle prior to the removal of the molding from the molds.

9. Molding apparatus comprising:
   (a) a first mold member having a cavity therein with walls shaped to define a first portion of the surface of an article to be molded therein,
   (b) a second mold member having a protruding portion adapted to enter the cavity in said first mold member and providing a wall for defining the remaining portions of the surface of an article to be molded between said two mold members,
   (c) guide means for guiding one of said mold members to close against the other,
   (d) power means operatively connected to said one mold member for advancing and retracting said mold member with respect to the other,
   (e) control means for automatically controlling said power means for moving the mold member connected thereto from a retracted position to a first position with respect to the other mold member whereby the protruding portion of said second mold member is partially inserted into the cavity in said first mold member,
   (f) a passageway in one of said mold members communicating with the molding cavity,
   (g) means for admitting a predetermined quantity of molding material to the molding cavity by flowing said molding material through said passageway while the power operated mold member is in said first position, and
   (h) means for automatically controlling said power means after admission of molding material to the molding cavity to cause complete closure of the mold and to further move said mold members together to compress and shape the molding material in the volume defined by the walls of the cavity formed between said two mold members.

10. Apparatus in accordance with claim 9 wherein said means for controlling said power means to further move said mold members together is operative to effect said further motion after the charge of molding material is completely charged into said cavity.

11. Apparatus in accordance with claim 9 wherein said means for controlling said power means to further move said mold members together is operative to effect said further motion before the charge of molding material is completely charged into said cavity.

12. Molding apparatus comprising:
   (a) a first mold member having a cavity with walls shaped to define a first portion of the surface of an article to be molded therein,
   (b) a second mold member having a protruding portion adapted to enter the cavity of said first mold member, said protruding portion being operative to shape an article of molding material by engaging said molding material disposed within the cavity of said first mold member,
   (c) guide means for guiding one of said mold members to close against the other,
   (d) first servo means operatively connected to said one mold member for advancing and retracting it with respect to the other mold member,
   (e) injection means for flowing molten molding material into said cavity of said first mold member,
   (f) second control means for said injection means, and
   (g) master control means for automatically controlling said first and second control means in timed sequence to effect the flow of a predetermined quantity of molten molding material to said cavity of said first mold member and to thereafter cause said protruding portion of said second mold member to enter the cavity containing said molding material, and
   (h) means for guiding and moving said protruding portion of said second mold member into the cavity in said first mold member in a manner to cause said protruding portion to compress and cause the molding material to conform to the shape defined by said cavity of said first mold member and said protruding portion of said second mold member.

13. Apparatus in accordance with claim 12, said protruding portion of said second mold member having a passageway extending therethrough and opening above said cavity in said second mold member when said first and second mold members are retracted, said injection means for flowing molten molding material being operatively connected to said passageway.

14. Molding apparatus comprising in combination:
   a mold composed of first and second mold members defining a molding cavity when said mold members are operatively assembled together for molding,
   means for guiding at least one of said mold members into operative relation with the other for molding an article therebetween,
   first power means including a motor for driving said one mold member into operative relation with the other, said first power means also being operative for separating said mold members to permit removal of the article molded therebetween,
   a master control means having a first control output for said motor including means for generating a command control signal on said output, means for generating a feedback signal which varies in accordance with the operation of said first power means, comparator means for receiving said command control signal and said feedback signal and operative to generate a difference signal, and
   means for applying said difference signal to control said first power means to predeterminately drive said mold members together,
   molding material injection means for admitting molding material to said mold,
   control means for said injection means,
   said master control means being connected to said injection control means and operative to control same in a cycle which includes predeterminately closing and opening said mold and the predetermined injection of molding material into said cavity in predetermined time relationship with the closing of said mold.

15. Molding apparatus in accordance with claim 14, wherein said control means for said injection means includes power operative means for variably controlling the injection of molding material to the mold, said master control means being operative to command a control signal for controlling said power operated means for said injection means, means for generating a feedback signal which varies in accordance with the operation of the power means for said injection means, an injection means control comparator means operatively connected to said master control means and said feedback signal generating means associated with said power means for said injection means, said injection means control comparator means having an output on which difference signals are generated and means for applying said latter difference signals to control operation of said power means for said injection means to predeterminately control the injection of molding material into the mold.

16. Molding apparatus comprising:
a mold having first and second mold sections defining a molding cavity when assembled together,
means for moving said mold sections together to close said mold cavity,
means for separating said mold sections to open said mold permitting removal of the molded article from the cavity,
a supply of first molding material,
first passageway means connecting said first molding material supply and said mold cavity and
first control means for controlling flow of said first molding material through said first passageway means to said mold cavity,
a supply of second molding material,
second passageway means connecting said second molding material supply and said mold cavity,
second control means for controlling the flow of said second molding material through said second passageway means to said mold cavity and
means for operating said first and second control means in synchronization with each other and in a manner to cause said first and second molding materials to be respectively flowed into said mold cavity and form respective predetermined portions of an article molded to shape in said mold cavity.

References Cited
UNITED STATES PATENTS

| | | | |
|---|---|---|---|
| 2,410,909 | 11/1946 | Tucker | 18—30 CK |
| 2,804,752 | 9/1957 | Norman et al. | 18—30 CK X |
| 3,016,574 | 1/1962 | Fischer et al. | 18—30 LKM |
| 3,117,348 | 1/1964 | Rees | 18—30 CK |
| 3,146,287 | 8/1964 | Kleine-Albers | 18—30 SR X |
| 3,339,227 | 8/1967 | Ehrenfreund | 18—2 I |
| 3,226,769 | 1/1966 | Williamson et al. | 18—30 CK UX |
| 3,373,459 | 3/1968 | Hehl | 18—30 PP |

J. SPENCER OVERHOLSER, Primary Examiner

M. O. SUTTON, Assistant Examiner

U.S. Cl. X.R.

18—16 C, 30 QT

REEXAMINATION CERTIFICATE (2221st)
United States Patent [19]
Lemelson

[11] B1 3,616,495
[45] Certificate Issued Feb. 22, 1994

[54] MOLDING APPARATUS

[76] Inventor: Jerome H. Lemelson, Suite 286, Unit 802, 930 Tahoe Blvd., Incline Village, Nev. 89451-9436

Reexamination Request:
No. 90/002,867, Oct. 29, 1992

Reexamination Certificate for:
| | |
|---|---|
| Patent No.: | 3,616,495 |
| Issued: | Nov. 2, 1971 |
| Appl. No.: | 721,401 |
| Filed: | Apr. 15, 1968 |

Related U.S. Application Data

[63] Continuation-in-part of Ser. No. 421,860, Dec. 29, 1964, abandoned, and a continuation-in-part of Ser. No. 421,817, Dec. 29, 1954, abandoned, and a continuation-in-part of Ser. No. 439,549, Mar. 15, 1965, abandoned, which in turn are continuations-in-part of application Ser. No. 734,340, May 9, 1958, Pat. No. 3,173,175, and is a continuation-in-part of Ser. No. 142,405, Oct. 2, 1961, Pat. No. 3,422,648.

[51] Int. Cl.⁵ .................................................... B29C 45/77
[52] U.S. Cl. ..................................... 425/155; 425/152; 425/159; 425/160; 425/162; 425/167

[56] References Cited

U.S. PATENT DOCUMENTS

| | | | |
|---|---|---|---|
| 1,564,490 | 12/1925 | Parkhurst | 425/414 |
| 1,655,815 | 1/1928 | Johanson | 137/624.11 |
| 1,843,159 | 2/1932 | Ingle | 65/75 |
| 2,035,801 | 3/1936 | Gastrow | 425/156 |
| 2,107,190 | 2/1938 | Shaw | 425/143 |
| 2,111,857 | 3/1938 | Jeffrey | 425/548 |
| 2,283,751 | 5/1943 | Ferngren | 264/163 |
| 2,333,059 | 10/1943 | Tucker | 264/161 |
| 2,337,550 | 12/1943 | Crosby | 264/250 |
| 2,350,539 | 6/1944 | Smith | 425/144 |
| 2,365,282 | 12/1944 | Lester et al. | 60/375 |
| 2,410,909 | 11/1946 | Tucker | 425/146 |
| 2,418,856 | 4/1947 | Stacy | 264/328.8 |
| 2,423,914 | 7/1947 | Wacker | 425/550 |
| 2,432,919 | 12/1947 | McCoy | 425/157 |
| 2,442,835 | 6/1948 | Allen | 318/443 |
| 2,444,186 | 6/1948 | Elliot et al. | 318/443 |
| 2,475,245 | 7/1949 | Leaver | 318/39 |
| 2,476,272 | 7/1949 | Bauman | 425/186 |
| 2,494,181 | 1/1950 | Laiho | 200/5 R |
| 2,496,021 | 1/1950 | Reed | 307/112 |
| 2,505,540 | 4/1950 | Goldhard | 425/145 |
| 2,521,847 | 9/1950 | Harr | 264/319 |
| 2,523,137 | 9/1950 | Nichols | 425/158 |
| 2,535,436 | 12/1950 | Maynard | 264/328.16 |
| 2,536,506 | 1/1951 | Kleber | 425/158 |
| 2,537,770 | 1/1951 | Livingston | 318/568.1 |
| 2,540,146 | 2/1951 | Stober | 523/351 |
| 2,556,095 | 6/1951 | Loewenstein | 318/466 |
| 2,569,174 | 9/1951 | Kardorff | 425/136 |
| 2,580,787 | 1/1952 | Johnson | 307/141.8 |
| 2,582,260 | 1/1952 | Kutik | 425/550 |
| 2,595,083 | 4/1952 | Kilgen | 307/112 |
| 2,618,292 | 11/1952 | Bing | 251/48 |
| 2,632,207 | 3/1953 | Mahla | 425/144 |
| 2,660,628 | 11/1953 | Kilgen | 200/18 |
| 2,671,246 | 3/1954 | Lester | 425/157 |
| 2,671,247 | 3/1954 | Lester | 425/149 |
| 2,672,579 | 3/1954 | Jochem | 361/191 |
| 2,701,825 | 2/1955 | Gracey | 200/5 R |
| 2,703,347 | 3/1955 | Constantine | 200/27 B |
| 2,710,934 | 6/1955 | Senn | 318/569 |
| 2,718,662 | 9/1955 | Bohannon et al. | 425/146 |
| 2,747,222 | 5/1956 | Koch | 264/211.21 |
| 2,747,224 | 5/1956 | Koch et al. | 264/211.21 |
| 2,753,605 | 7/1956 | Carleton, Jr. | 164/155 |
| 2,786,234 | 3/1957 | Beyer | 264/328.13 |
| 2,789,165 | 4/1957 | Nichols | 200/5 R |
| 2,789,541 | 4/1957 | Gaspar | 91/35 |
| 2,804,752 | 9/1957 | Norman | 425/145 |
| 2,834,051 | 5/1958 | Rekettye | 425/146 |
| 2,896,279 | 7/1959 | Nyselius | 164/256 |
| 2,913,767 | 11/1959 | Simon | 425/235 |
| 2,916,792 | 12/1959 | Crook et al. | 264/40.7 |
| 2,938,232 | 5/1960 | Martin | 425/562 |
| 3,002,615 | 10/1961 | Lemelson | 72/8 |
| 3,009,203 | 11/1961 | Polete | 425/149 |
| 3,016,574 | 1/1962 | Fischer et al. | 425/170 |
| 3,020,607 | 2/1962 | Nyselius | 164/315 |
| 3,034,177 | 5/1962 | Hooper | 264/250 |
| 3,039,687 | 6/1962 | Chope | 364/173 |
| 3,069,608 | 12/1962 | Forrester | 318/570 |
| 3,117,348 | 1/1964 | Rees | 425/154 |
| 3,146,287 | 8/1964 | Kleine-Albees | 264/328.13 |
| 3,148,231 | 9/1964 | Spencer | 264/40.6 |

| | | | |
|---|---|---|---|
| 3,153,814 | 10/1964 | Ohrnberger | 425/144 |
| 3,175,247 | 3/1965 | Morrison | 118/674 |
| 3,178,497 | 4/1965 | Moscicki | 264/245 |
| 3,194,857 | 7/1965 | White | 425/105 |
| 3,212,128 | 10/1965 | Carlson | 425/4 R |
| 3,221,373 | 12/1965 | Kwan | 425/132 |
| 3,226,769 | 1/1966 | Williamson et al. | 425/135 |
| 3,244,082 | 4/1966 | Lemelson | 228/18 |
| 3,302,253 | 2/1967 | Moriyama | 164/154 |
| 3,330,003 | 7/1967 | Eggenberger et al. | 425/159 |
| 3,339,227 | 9/1967 | Ehrenfreund | 425/144 |
| 3,359,601 | 12/1967 | Evans | 425/156 |
| 3,373,459 | 3/1968 | Hehl | 425/595 |
| 3,461,197 | 8/1969 | Lemelson | 264/172 |
| 3,509,600 | 5/1970 | Noble | 425/145 |
| 3,525,382 | 8/1970 | Devol | 164/154 |
| 3,538,548 | 11/1970 | Tenner | 425/141 |
| 3,795,719 | 3/1974 | Morecroft | 264/40.5 |
| 3,857,658 | 12/1974 | Muzsnay | 425/150 |

FOREIGN PATENT DOCUMENTS

| | | |
|---|---|---|
| 1115918 | 10/1961 | Fed. Rep. of Germany . |
| 1138210 | 10/1962 | Fed. Rep. of Germany . |
| 1152250 | 8/1963 | Fed. Rep. of Germany . |
| 1529751 | 5/1969 | Fed. Rep. of Germany . |
| 978514 | 4/1951 | France . |
| 1539204 | 8/1968 | France . |
| 545318 | 6/1956 | Italy . |
| 33-7170 | of 1958 | Japan . |
| 36-11637 | of 1961 | Japan . |
| 39-19044 | of 1964 | Japan . |
| 40-1664 | of 1965 | Japan . |
| 336594 | 2/1959 | Switzerland . |
| 397234 | 8/1965 | Switzerland . |
| 643847 | 9/1950 | United Kingdom . |
| 1069734 | 5/1967 | United Kingdom . |
| 1110534 | 4/1968 | United Kingdom . |
| 1134185 | 11/1968 | United Kingdom . |

OTHER PUBLICATIONS

Bureau of Naval Personnel, Pub. No. 10784, "Principles of Guided Missiles and Nuclear Weapons" pp. 8-11, 70-114, 178 ∝ 180; 1959.
Walter Ernst, Oil Hydraulic Power and its Industrial Applications pp. 375-385, 389, 444 ∝ 445; 1960.
"High-Speed Preplasticizer," *Modern Plastics,* pp. 93-96, 186-187 (Jan. 1954).
Cretin, "Connaissance du Moulage par Injection," *Industrie des Plastiques Modernes* (1955).
Gardner, "Programmed Injection," *Plastics,* pp. 285-288 (Mar. 1967).
Dall, "Machine Hydraulics, Part I-Throttle Circuits," *Machine Design* (Apr. 1946) pp. 143-148.
Dall, "Machine Hydraulics, Part II-Balanced Circuits," *Machine Design* (Jun. 1946), pp. 111-114.
Dall, "Machine Hydraulics, Part III-Variable Delivery Circuits," *Machine Design* (Aug. 1946), pp. 125-128.
Dall, "Machine Hydraulics, Part IV-Special Valves," *Machine Design* (Oct. 1946), pp. 87-90.
Dall, "Machine Hydraulics, Part V-Sensitive Servos and Tracers," *Machine Design* (Dec. 1946), pp. 119-123.
Delmonte, *Plastics Molding,* pp. 326-329 (1952).
Beck, "Spritzgussmaschinen," *Kunststoffe Bd.* 12 (1952).
"A molder's molding machine," *Modern Plastics,* (Jun. 1957).
*Proceedings of the 13th National Conference on Industrial Hydraulics,* (Oct. 17-18, 1957), pp. 77-83, 85-92, 117-132, 209-210, 215-231.
Bishop, "New Designs of Injection Molding Machines," *SPE Journal,* pp. 38-39 (Aug. 1958).
Beyer, "Pressure Control for Injection Molding Machines," *Plastics Technology,* pp. 459-480 (Jun. 1957).
Moyer, "Developments During 1958 in Processing of Plastics Materials," *Plastics Technology,* pp. 45-48 (Jan. 1959).
"New 60 oz Injection Moulding Machine," *British Plastics,* pp. 360-362 (Aug. 1958).
Robbins et al, "Transistorized Programmer Runs 35,000-Ton Press," *Control Engineering,* pp. 133-135 (May 1959).
Kriner, "Injection Molding Machines 1961," (pub. date unknown).
Kleine-Albers, *Verarbeitung von Weichmacherfreiem PVC auf Einschnecken-Spritzgusmaschinen,* pp. 205-212 (1961).
"Screw-Ram Injection Molding Machines," *Rubber and Plastics Age,* pp. 1390-1391 (Dec. 1962).
Evans, "Reciprocating Screw Injection Machines," (Mar. 1963).
Barton, "New Horizons in Die Casting," *Machinery,* pp. 98-111 (Apr. 1963).
Bronsard, "Programmed Speed for Blow Molder," *Hydraulics and Pneumatics,* pp. 70-71 (Jun. 1964).

"Now You Can Program Injection Speed," *Plastics Technology*, pp. 15-16 (Nov. 1965).

Evans, "Future of Reciprocating Screw Looks Bright," reprinted from *Plastics Design and Processing* (Oct. 1964).

Evans, "Injection Molding with Programmed Rates," (pub. date unknown).

Perras, "A Molder's Guide to Mold Design," *Plastics Technology*, pp. 43-49 (Jan. 1968).

Evans, "What You Can Do Now to Control the Injection Process," *Plastics Technology* (Jan. 1968).

Schanzle et al, "Rapid, easily programmed parison control," *Modern Plastics*, pp. 137-138 (Jan. 1969).

"New Injection Machine Offers Optional Computer Control," *Plastics Technology*, pp. 15-17 (Sep. 1968).

Evans, "For Quality Injection Molding, Know Your Screw Machine," *Plastics Technology*, p. 40 (pub. date unknown).

Carlson, "An Injection Molder's Guide to Solid-State Control Systems," *Plastics Technology*, pp. 39 & 42 (Nov. 1968).

Nitka, "Use Electrohydraulic Pump-Servos for Heavy Industrial Control," 4 *Control Engineering* 81 (Apr. 1957).

*Primary Examiner*—Tim Heitbrink

[57] ABSTRACT

An apparatus and method for the controlled molding of materials is provided whereby a plurality of molding variables may be predeterminately controlled in accordance with variations in the molding materials, size and shape of the molded parts and desired physical characteristics of the finished article. Molding variables such as movement of one or more mold components, timing of the injection of molding material, variations in flow of molding material and heating or cooling of the mold walls may be preprogrammed so as to each vary predetermined degrees during a molding cycle so that such variables increase and/or decrease in predetermined relationship to each other to provide a molded article having predetermined and optimum physical characteristics.

In one form of the invention, molding variables are controlled by the reproduction of prerecorded analog signals from a recording member which signals are used to variably control motors controlling the molding variables. The analog signals may be derived from transducers indicating variations in said motors during the operation of an optimum molding cycle.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–11, 14, 15 is confirmed.

Claims 12, 13, 16 are cancelled.

* * * * *

REEXAMINATION CERTIFICATE (2431st)
United States Patent [19]
Lemelson

[11] B2 3,616,495
[45] Certificate Issued  Nov. 22, 1994

[54] MOLDING APPARATUS

[76] Inventor: Jerome H. Lemelson, Ste. 286, Unit 802, 930 Tahoe Blvd., Incline Village, Nev. 89451

Reexamination Request:
No. 90/003,288, Dec. 23, 1993

Reexamination Certificate for:
Patent No.: 3,616,495
Issued: Nov. 2, 1971
Appl. No.: 721,401
Filed: Apr. 15, 1968

Related U.S. Application Data

[63] Continuation-in-part of Ser. No. 421,860, Dec. 29, 1964, abandoned, and a continuation-in-part of Ser. No. 421,817, Dec. 29, 1964, Pat. No. 3,462,524, and a continuation-in-part of Ser. No. 439,549, Mar. 15, 1965, abandoned, which in turn are continuations-in-part of application Ser. No. 734,340, May 9, 1958, Pat. No. 3,173,175, and is a continuation-in-part of Ser. No. 142,405, Oct. 2, 1961, Pat. No. 3,422,648.

[51] Int. Cl.$^5$ .............................................. B29C 45/77
[52] U.S. Cl. ................................... 425/155; 425/152; 425/159; 425/160; 425/162; 425/167

[56] References Cited

U.S. PATENT DOCUMENTS

| | | | |
|---|---|---|---|
| 2,410,909 | 11/1946 | Tucker | 18/30 CK |
| 2,418,856 | 4/1947 | Stacy | 264/328.8 |
| 2,535,436 | 12/1950 | Maynard | 264/328.16 |
| 2,786,234 | 3/1957 | Beyer | 264/328.13 |
| 2,804,752 | 9/1957 | Norman et al. | 18/30 CK |
| 3,002,615 | 10/1961 | Lemelson | 72/8 |
| 3,016,574 | 1/1962 | Fischer et al. | 18/30 LKM |
| 3,117,348 | 1/1964 | Rees | 18/30 CK |
| 3,146,287 | 8/1964 | Kleine-Albers | 18/30 SR X |
| 3,226,769 | 1/1966 | Williamson et al. | 18/30 CK UX |
| 3,339,227 | 8/1967 | Ehrenfreund | 18/2 I |
| 3,373,459 | 3/1968 | Hehl | 18/30 PP |

FOREIGN PATENT DOCUMENTS 624069 1/1934 Germany.

OTHER PUBLICATIONS

Gardner, "Programmed Injection", *Plastics*, vol. 31, No. 353, pp. 285–288, Mar. 1967.
Nitka, "Use Electrohydraulic Pump–Servos for Heavy Industrial Control", 4, *Control Engineering*, 81, (Apr. 1957).

*Primary Examiner*—Tim Heitbrink

[57] ABSTRACT

An apparatus and method for the controlled molding of materials is provided whereby a plurality of molding variables may be predeterminately controlled in accordance with variations in the molding materials, size and shape of the molded parts and desired physical characteristics of the finished article. Molding variables such as movement of one or more mold components, timing of the injection of molding material, variations in flow of molding material and heating or cooling of the mold walls may be preprogrammed so as to each vary predetermined degrees during a molding cycle so that such variables increase and/or decrease in predetermined relationship to each other to provide a molded article having predetermined and optimum physical characteristics.

In one form of the invention, molding variables are controlled by the reproduction of prerecorded analog signals from a recording member which signals are used to variably control motors controlling the molding variables. The analog signals may be derived from transducers indicating variations in said motors during the operation of an optimum molding cycle.

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1-11, 14 and 15 is confirmed.

Claims 12, 13 and 16 were previously cancelled.

* * * * *